(12) United States Patent
Escalettes et al.

(10) Patent No.: US 10,561,983 B2
(45) Date of Patent: Feb. 18, 2020

(54) FILTRATION DEVICE FOR AIR PURIFICATION APPLIANCE

(71) Applicants: SEB S.A., Ecully (FR); ETHERA, Grenoble (FR)

(72) Inventors: Bertrand Escalettes, Menilles (FR); Alper Caliskan, Vernon (FR); Patrick Morin, Heubecourt (FR); Emmanuel Chevallier, Gif-sur-Yvette (FR); Thomas Caron, Massy (FR); Sylvain Colomb, Grenoble (FR)

(73) Assignees: SEB S.A., Ecully (FR); ETHERA, Crolles (FR)

( * ) Notice: Subject to any disclaimer, the term of this patent is extended or adjusted under 35 U.S.C. 154(b) by 0 days.

(21) Appl. No.: 15/514,205

(22) PCT Filed: Sep. 24, 2015

(86) PCT No.: PCT/FR2015/052548
§ 371 (c)(1),
(2) Date: Mar. 24, 2017

(87) PCT Pub. No.: WO2016/046498
PCT Pub. Date: Mar. 31, 2016

(65) Prior Publication Data
US 2017/0296967 A1   Oct. 19, 2017

(30) Foreign Application Priority Data

Sep. 24, 2014   (FR) ...................................... 14 59039

(51) Int. Cl.
*B01D 53/82*   (2006.01)
*F24F 3/16*   (2006.01)
(Continued)

(52) U.S. Cl.
CPC ......... *B01D 53/82* (2013.01); *B01D 53/0415* (2013.01); *B01D 53/72* (2013.01);
(Continued)

(58) Field of Classification Search
CPC .... B01D 53/0415; B01D 53/72; B01D 53/82; B01D 2253/102; B01D 2253/108;
(Continued)

(56) References Cited

U.S. PATENT DOCUMENTS

| 4,917,862 A | 4/1990 | Kraw et al. |
| 8,173,440 B2 | 5/2012 | Paolacci et al. |

(Continued)

FOREIGN PATENT DOCUMENTS

| EP | 0897738 A1 | 2/1999 |
| EP | 1121978 A2 | 8/2001 |

(Continued)

*Primary Examiner* — Timothy C Cleveland
(74) *Attorney, Agent, or Firm* — The Webb Law Firm

(57) ABSTRACT

A filtration device for an air purification appliance includes a first filtering cartridge structure containing a classic absorbent or adsorbent material selected from activated carbon or zeolite and a second, different filtering cartridge structure holding a filtering medium consisting of a specific adsorbent material which is porous and functionalized with at least one probe molecule in such a way as to trap aldehyde-type chemical contaminants.

12 Claims, 3 Drawing Sheets

(51) Int. Cl.
*B01D 53/04* (2006.01)
*B01D 53/72* (2006.01)
*B01J 20/00* (2006.01)
*B01J 20/32* (2006.01)
*B01J 20/06* (2006.01)
*B01J 20/18* (2006.01)
*B01J 20/20* (2006.01)
*B01J 20/28* (2006.01)

(52) U.S. Cl.
CPC ............... *B01J 20/00* (2013.01); *B01J 20/06* (2013.01); *B01J 20/18* (2013.01); *B01J 20/20* (2013.01); *B01J 20/28016* (2013.01); *B01J 20/28028* (2013.01); *B01J 20/28047* (2013.01); *B01J 20/28061* (2013.01); *B01J 20/28064* (2013.01); *B01J 20/28066* (2013.01); *B01J 20/3204* (2013.01); *B01J 20/3217* (2013.01); *B01J 20/3236* (2013.01); *B01J 20/3248* (2013.01); *B01J 20/3293* (2013.01); *F24F 3/1603* (2013.01); *B01D 2251/21* (2013.01); *B01D 2251/80* (2013.01); *B01D 2253/102* (2013.01); *B01D 2253/108* (2013.01); *B01D 2253/1124* (2013.01); *B01D 2253/308* (2013.01); *B01D 2257/708* (2013.01); *B01D 2259/4145* (2013.01); *B01D 2259/4508* (2013.01); *B01J 2220/62* (2013.01); *F24F 2003/1621* (2013.01); *F24F 2003/1625* (2013.01); *F24F 2003/1628* (2013.01)

(58) Field of Classification Search
CPC ....... B01D 2253/1124; B01D 2257/708; B01J 20/06; B01J 20/18; B01J 20/20; B01J 20/28016; B01J 20/28028; B01J 20/28047; B01J 20/28061; B01J 20/28064; B01J 20/3217; B01J 20/3236; B01J 20/3293; F24F 3/1603; F24F 2003/1621; F24F 2003/1625; F24F 2003/1628
See application file for complete search history.

(56) References Cited

U.S. PATENT DOCUMENTS 8,404,023 B1 * 3/2013 Osborne ............ B01D 53/0407
   95/148
2014/0224127 A1   8/2014 Nagata et al.

FOREIGN PATENT DOCUMENTS

| | | |
|---|---|---|
| FR | 2890745 A1 | 3/2007 |
| WO | 2010101520 A1 | 9/2010 |
| WO | 2014078708 A1 | 5/2014 |

* cited by examiner

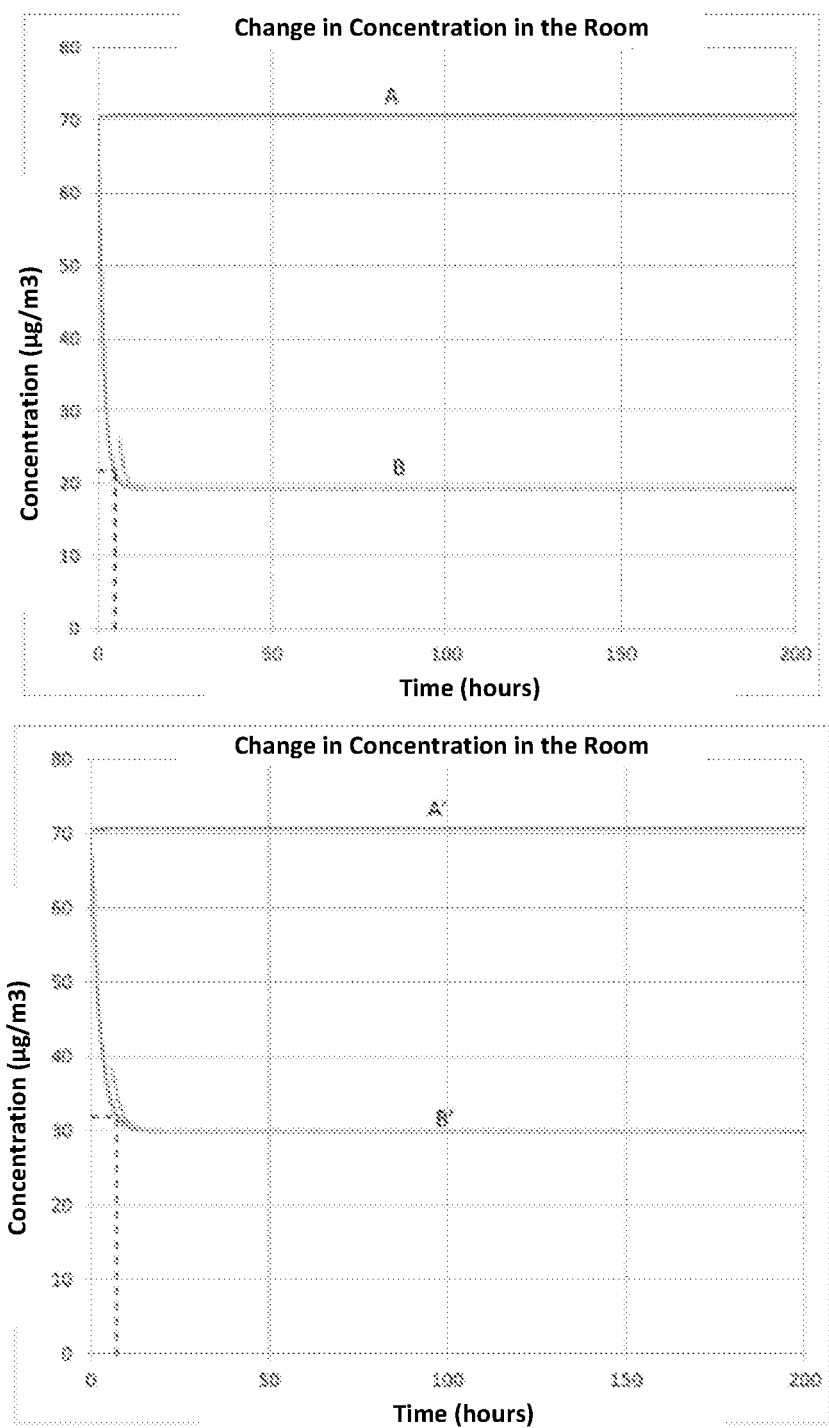

US 10,561,983 B2

FILTRATION DEVICE FOR AIR PURIFICATION APPLIANCE

CROSS-REFERENCE TO RELATED APPLICATIONS

This application is the United States national phase of International Application No. PCT/FR2015/052548 filed Sep. 24, 2015, and claims priority to French Patent Application No. 1459039 filed Sep. 24, 2014, the disclosures of which are hereby incorporated in their entirety by reference.

BACKGROUND OF THE INVENTION

Field of the Invention

This invention pertains generally to the field of ambient air purification appliances, and more specifically to filtration devices for this type of appliance, having the ability to absorb aldehydes and formaldehydes in particular.

Description of Related Art

The term aldehyde designates any organic molecule, with a terminal carbonyl function, preferably chosen from among formaldehyde, acetaldehyde, propionaldehyde, butyraldehyde, acrolein, pentanal, hexanal and benzaldehyde.

Aldehydes are among the most abundant household chemical contaminants. Their sources are extremely numerous. In particular, they can be related to outdoor production such as the photo-oxidation of methane. However, the main sources of aldehyde emissions are found inside the home, and are very diverse: the resins and glues used to produce chipboard, particleboard and plywood, urea formaldehyde insulation foam used as thermal insulation, by injection into walls and partitions, in textile coatings, wallpaper, paint and leather, among others.

Formaldehyde is also a preservative, disinfectant and dehydrating agent. For these reasons, it is used abundantly as a solvent in hospitals for disinfecting surgical instruments, as well as in the funeral industry, where embalming is performed.

In light of the harmful effects of such chemical contaminants on public health, it appears necessary to purify the ambient air of residential buildings by reducing the aldehyde content, particularly formaldehydes, and by offering new decontamination devices.

According to the existing prior art, the methods of purifying gaseous chemical contaminants present in the ambient air fall into two categories:

Destruction of the contaminant by breaking down the organic compounds to complete mineralization, or in other words, until they are transformed into $CO_2$ and $H_2O$ through oxidation or photo-oxidation.

Trapping, by porous adsorbent materials that hold the contaminants, but do not break them down. These materials are of the zeolite or activated carbon type, and are commonly used in ambient air treatment to trap volatile organic compounds and odors.

The first category is made up of devices using oxidants such as ozone, or promoting oxidation, such as plasmas or photo-catalysis.

The second category uses the adsorbent capacities and powers of porous materials with a large specific surface (>100 $m^2/g$). It does not make it possible to break down the molecules; rather, it holds them in a porous medium.

The first category presents the disadvantages of being complex and relatively expensive. In addition, it can generate decomposition byproducts that may be more hazardous than the compound eliminated.

The second category presents the disadvantage of having trapping rates that vary widely from one chemical compound being eliminated to another. For example, activated carbon is effective in adsorbing aromatic compounds, but is known to be ineffective in adsorbing aldehydes. Moreover, in this second category, the porous medium is likely to re-release contaminant molecules once it is saturated or subjected to an increase in temperature or relative humidity, or to a decrease in the concentration of the trapped contaminant. This is the case, for example, with activated carbon or zeolite.

WO 2014/07808 describes porous materials commonly used to adsorb volatile organic compounds, particularly zeolite or activated carbon. This document also describes cartridges that adsorb volatile organic compounds; these adsorbent cartridges can be combined with alumina-based $CO_2$ filtration cartridges in order to adsorb as much noxious gas as possible.

According to FR 2890745, one particularly effective porous material for eliminating aldehydes, and more specifically, formaldehyde, is a nanoporous matrix of metal oxides comprising at least one aldehyde-reactive function.

Manufacturers of adsorbent materials are working on improving the efficacy of their materials by functionalizing them. Unfortunately, this functionalization is done by impregnation, which presents the disadvantage of limiting access to the specific surface in the case of heavy impregnations, and therefore of limiting the trapping capacities, if one is to impregnate in sufficient quantity.

SUMMARY OF THE INVENTION

In a first aspect, one objective of the invention is to improve the performance of filtration devices for ambient air purification appliances, by combining therein a traditional material that absorbs or adsorbs chemical compounds contaminating the ambient air with a specific adsorbent medium. We will use the term "specific adsorbent medium" or even "filtering medium" for any material capable of adsorbing chemical compounds contaminating the ambient air, for which traditional adsorbent materials are ineffective, with particular focus on aldehydes and notably, formaldehyde.

In a second aspect, one objective of the invention is to definitively trap contaminants in the ambient air through absorption.

In a third aspect, one objective of the invention is to prevent any re-releasing into the ambient air of contaminants that might be re-released by traditional adsorbent materials, such as zeolite or activated carbon.

Thus, the device in the invention comprises or consists of at least two filtering cartridges, one of which contains a traditional absorbent or adsorbent material, and another which contains a specific adsorbent medium, said device causing the ambient air to pass through the at least two cartridges, for the purpose of definitively trapping, in large quantity, the vast majority of atmospheric contaminants.

More specifically, the device of the invention is a filtration device for an air purification appliance, comprising a first filtering cartridge structure containing a traditional absorbent or adsorbent material selected from activated carbon or zeolite, characterized in that the filtration device comprises a second, separate filtering cartridge structure holding a filtering medium consisting of a specific adsorbent material that is porous and functionalized with at least one probe molecule in such a way as to trap aldehyde-type chemical contaminants.

In one embodiment, the specific adsorbent material is manufactured through a sol-gel process for synthesis into a porous structure, and preferably a nanoporous structure of metal oxides, of probe molecules capable of trapping aldehydes. Advantageously, this process is a one-pot synthesis process.

In one embodiment, the probe molecule possessing a reactive function capable of reacting with an aldehyde function is selected from among enaminones and the corresponding β-diketone/amine pairs, imines, amines, imides and hydrazines, or the salts derived from these compounds. Such probe molecules are known the art, as evidenced by FR 2890745.

In one embodiment, the structure that holds the filtering media is a rigid alveolar structure, the alveoli containing the filtering medium.

In one embodiment, a micro-perforated film is assembled on the upstream and downstream surfaces of the rigid alveolar structure.

In one embodiment, the fill percentage of filtering medium in the alveoli is greater than 40%, and preferably greater than 50%.

In one embodiment, the specific adsorbent material is in the form of granules. Preferably, the granules are cylindrical, with an L/D ratio of >1, in which L represents the length of one granule and D represents the diameter of one granule; D is preferably between 0.1 and 8 mm, and very preferably between 1 and 5 mm, more preferably between 2 and 4 mm, and even more preferably approximately 3 mm; L is preferably between 1 and 20 mm, very preferably between 2 and 10 mm, and more preferably approximately 5.5 mm. In this patent application, the term "approximately" used before a numerical value means a variation of plus or minus 15% of that numerical value.

In one embodiment, the structure that holds the filtering medium is an assembly of several films, of the non-woven porous fabric type, for example, onto which the filtering medium is impregnated/sprinkled and/or sandwiched with or without the traditional absorbent or adsorbent material.

In one embodiment, the mass of specific adsorbent material accounts for between 5 and 95% of the mass of traditional absorbent or adsorbent material.

In one embodiment, the specific surface of the specific adsorbent material is between 400 and 1200 $m^2/g$, preferably between 450 and 800 $m^2/g$, and very preferably approximately 600 $m^2/g$.

This application also pertains to an air purification appliance comprising the filtration device defined in one of the variations above.

BRIEF DESCRIPTION OF THE DRAWINGS

Other characteristics and advantages of this invention will become more clearly apparent upon reading the detailed description below of embodiments of the invention, which are provided as non-limiting examples and are illustrated in the attached drawings, in which:

FIG. 4 presents the change in formaldehyde concentration in a room, with a first embodiment variation of the filtration device;

FIG. 5 presents the change in formaldehyde concentration in a room with a second embodiment variation of the filtration device.

DETAILED DESCRIPTION OF TILE INVENTION

The major objective of the invention is a filtration device comprising multiple filtering materials. The different combined or separate filtering materials make it possible to eliminate, through absorption and adsorption, the volatile organic compounds present in the ambient air. According to the invention, the volatile organic compounds absorbed and adsorbed, are notably aldehydes and/or solvents. The filtration device is designed to be installed in an ambient air purification appliance that can operate at outputs of a few $m^3$/hour to several thousand $m^3$/hour.

Figure 1:
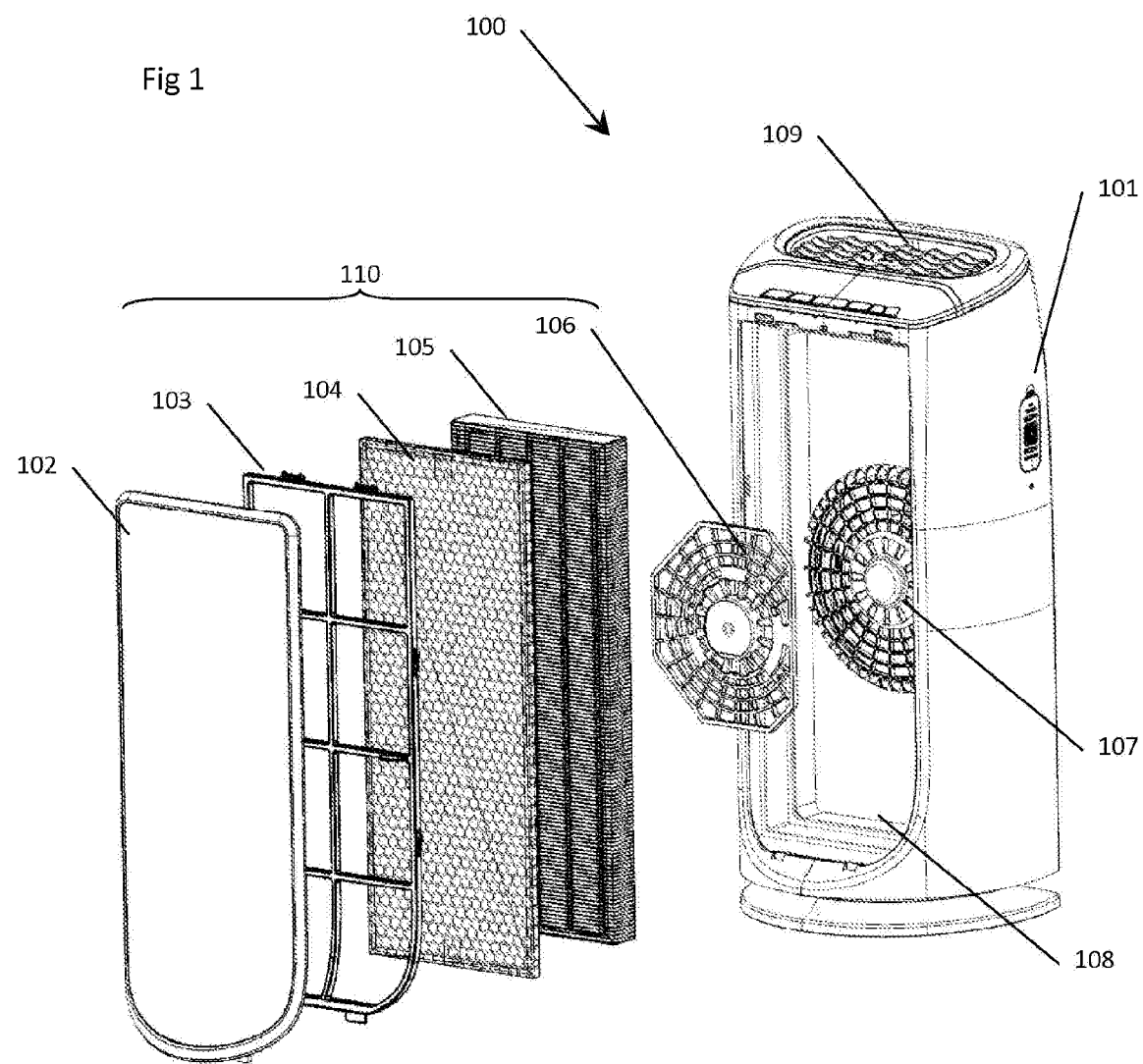
FIG. 1 depicts an exploded view of a filtration appliance comprising the filtration device.

FIG. 1 depicts an ambient air purification appliance (100) that can receive the filtration device according to the invention. The appliance essentially comprises a casing (101) comprising a housing (108) for a filtration device (110). The housing (108) is closed by a lid (102). Inlet holes (not depicted) are formed to allow the ambient air to enter the appliance (100). In one embodiment, the inlet holes are situated near the lid (102) of the casing (101). In one embodiment, the inlet holes are not situated near the lid (102) of the casing (101). The housing comprises, upstream of the filtration device (110) a motorized fan (not depicted), which creates a suction in the housing (108) through a screen (107). In one embodiment, the shape of the screen (107) is circular. In one embodiment, the shape of the screen (107) is inconsequential. The casing (101) also comprises outlet holes (109) for the purified air. In one embodiment, these outlet holes (109) are placed on the upper part of the casing (101). In another embodiment, these outlet holes (109) are placed on another surface of the casing (101).

In one embodiment, the filtration device (110) comprises at least two filtering cartridges (104 and 106). In one embodiment of the invention, the filtration device comprises four separate cartridges (103, 104, 105, 106), as depicted in FIG. 1.

According to the invention, a first filtering cartridge structure (104) contains a traditional absorbent or adsorbent material selected from activated carbon or zeolites. According to the invention, the filtration device (110) comprises a second filtering cartridge structure (106), separate from the first, containing a filtering medium in the embodiment variation depicted in FIG. 1.

This filtering medium consists of a specific adsorbent material to trap compounds that are very poorly eliminated by the traditional absorbent or adsorbent material, such as aldehyde-type compounds, and more particularly, formaldehyde.

The specific adsorbent material is a material that can specifically trap a contaminant or a family of contaminants. For example, the filtering medium can trap the aldehyde family through the use of probe molecules (or active principle) adapted and incorporated into a structure that is porous, and preferably microporous, and very preferably nanoporous. A carefully selected probe molecule can make it possible to trap one contaminant more specifically, such as formaldehyde. The sol-gel type manufacturing process of the specific adsorbent material makes it possible to add the active principle while it is being developed with the one-pot method (in situ) and not by impregnation. The manufacturing process of the specific adsorbent material makes it possible to add many active principles without impregnation. The saturation of the specific surface through impregnation is thereby avoided. In one embodiment, the specific adsorbent material contains neither zeolite nor activated carbon.

In one preferred embodiment, the ambient air entering through the inlet holes in the housing (108) will pass through, firstly, the filtering cartridge (104) containing a traditional absorbent or adsorbent material. In this same preferred embodiment, secondly, the air will pass through the filtering medium containing a specific adsorbent material.

In one embodiment, the filtering cartridges are cylindrical in shape. In one embodiment, the filtering cartridges are parallelepiped in shape. In one embodiment, the filtering cartridges are flat. In one embodiment, the filtering cartridges have volume. In one embodiment, the filtering cartridges are defined by an orthogonal outline. The smallest dimension, as compared to the other two dimensions (x and y) will be the z axis. In one embodiment, z and the air flow have the same direction. In one embodiment, z and the air flow have different directions.

In one embodiment, the filtering cartridges have equivalent dimensions in all three directions. In one embodiment, the filtering cartridges have two smaller dimensions in comparison to the third. In this embodiment, one of the smaller dimensions can represent z.

In one embodiment, an additional filtering cartridge (103) is a perforated film to stop dust and/or debris. In this embodiment, the filtering cartridge (103) is placed upstream in the filtering device (110). In one embodiment, an additional filtering cartridge (105) is a HEPA filter, an air filter capable of filtering, in one pass, at least 99.95% of particles with a diameter of greater than or equal to 0.3 μm.

Figure 2:
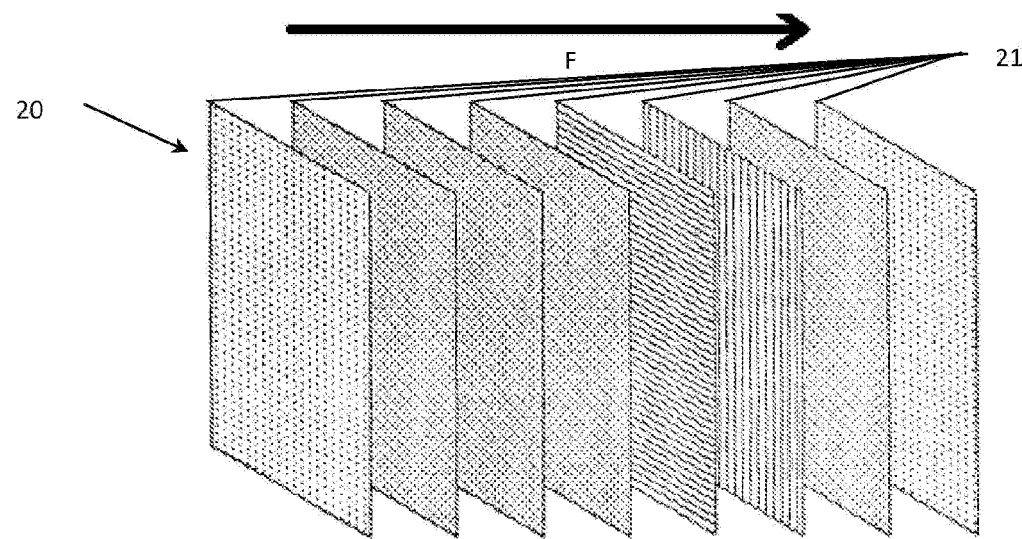
FIG. 2 is a diagram of a first filtering cartridge structure.
Figure 3A:
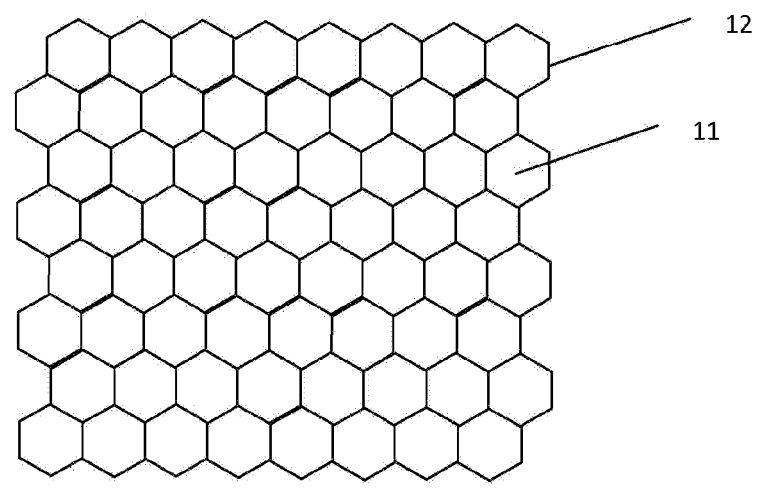
FIGS. 3A and 3B depict a front view and a perspective view, respectively, of a second structure of the filtration device.
Figure 3B:
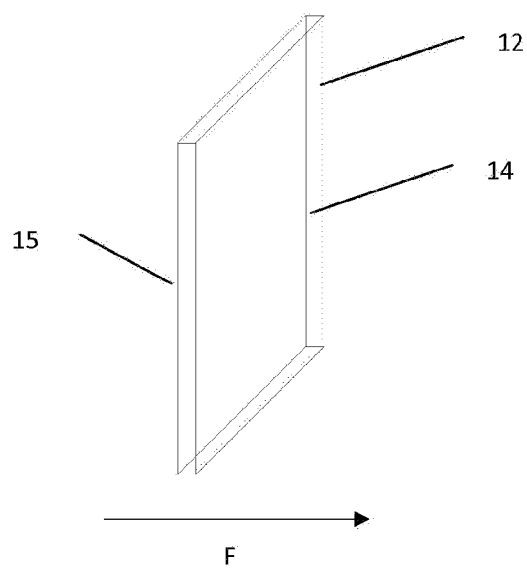

FIGS. 2, 3A and 3B depict embodiments of filtering cartridge structures that can be used in the invention.

These structures are capable of holding the filtering medium in the air flow passing through the air purification appliance.

FIG. 2 depicts a structure (20) comprising a series of films (21). In one embodiment, the filtering medium is impregnated in a film (21). In one embodiment, the filtering medium is impregnated in several films (21). The set of films (21) is then assembled to form the filtering cartridge. In one embodiment, the films are assembled by gluing. In one embodiment, the films are assembled by welding. In one embodiment, the films are assembled by an assembly technique.

The dimensions and number of films (21) depend primarily on the desired performance of the air purification appliance. In one embodiment, at least one film (21) is functionalized by a probe molecule. In one embodiment, no film (21) is functionalized by a probe molecule.

As depicted in FIGS. 3A and 3B, the filtering cartridge (106) comprises a rigid alveolar structure (12). In one embodiment, the alveolar structure is of the beehive type. In one embodiment, the alveolar structure contains alveoli of any geometric shapes. The filtering medium is placed in the alveoli (11) of the structure (12). In one embodiment and in order to ensure that the filtering medium is held in the alveoli (11), a micro-perforated film is placed on both surfaces, upstream (14) and downstream (15) of the rigid alveolar structure (12). In one embodiment, the film is completely transparent with respect to the air flow, and does not serve a filtering function. In one embodiment, the film is partially transparent with respect to the air flow. In one embodiment, the film serves at least one filtering function.

In the case of the sol-gel specific adsorbent material, the contaminant reacts with the reactive principle to produce a third body of a larger molecular weight that is less harmful and that will remain trapped in the nanoporous network of the filtering medium comprising a specific adsorbent material. Unlike other adsorbents, this specific adsorbent material definitively traps the contaminant through an irreversible chemical transformation.

Thus, by making an appropriate choice of probe molecule, it is possible to eliminate hazardous contaminants such as formaldehyde, a molecule that traditional adsorbent materials are unable to eliminate very well, or at all.

For example, the specific adsorbent material is selected from among the materials described in patent FR 2890745.

In one embodiment, the specific adsorbent material may comprise a sol-gel nanoporous matrix of metal oxides, said matrix containing at least one probe molecule possessing at least one reactive function capable of reacting with an aldehyde function.

The probe molecule possessing a reactive function capable of reacting with an aldehyde function can be selected from among enaminones and the corresponding β-diketone/amine pairs, imines, amines, imides and hydrazines, or the salts derived from these compounds.

Enaminones will be characterized by the formula below:

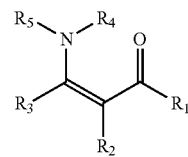

in which:

R1 is a hydrogen, an alkyl or aryl radical,

R2 is a hydrogen,

R3 is a hydrogen, an alkyl or aryl radical,

R4 is a hydrogen, an alkyl or aryl radical,

R5 is a hydrogen.

Moreover, the β-diketone/amine pair corresponds to the formula below:

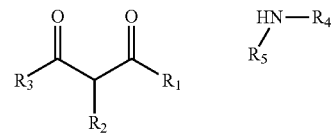

in which:

R1 is a hydrogen, an alkyl or aryl radical,

R2 is a hydrogen,

R3 is a hydrogen, an alkyl or aryl radical,

R4 is a hydrogen, an alkyl radical,

R5 is a hydrogen, or a corresponding salt,

And the amine can be replaced with its corresponding ammonium salt.

Moreover, the imine is a Schiff base selected from among acridine yellow, methyl or dimethyl yellow.

The hydrazine corresponds to the following formula:

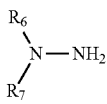

in which:
R6 is a hydrogen, a C1-C20-alkyl radical, and preferably C1-C10-, and more preferably methyl, ethyl, isopropyl, butyl, isobutyl, tert-butyl and pentyl, a C3-C16 aryl radical, and particularly phenyl and arylsulfonyl,
R7 is a C3-C16-aryl radical, and particularly phenyl and arylsulfonyl.

According to the invention, the sol-gel nanoporous matrix of metal oxides is developed from at least one metal oxide with the formula below:

$$M(X)_m(OR8)_n(R9)_p$$

in which:
M is a metal chosen from among silicon, aluminum, titanium, zirconium, niobium, vanadium, yttrium and cerium,
R8 and R9 are, independently, an alkyl or aryl radical,
n, m and p are integers, such that their sum is equal to the valence of M and n is greater than or equal to 2,
X is a halogen.

The specific adsorbent material as defined above, making it possible to specifically trap aldehydes and particularly formaldehyde, offers a level of efficacy in its capacity to trap formaldehyde that is greater than that of activated carbon dedicated to volatile organic compounds, and greater than that of activated carbon impregnated specifically for trapping gaseous formaldehyde. The definitive trapping capacity of the specific adsorbent material is at least 0.01 g of formaldehyde per gram of material.

According to the prior art, activated carbon or zeolites are very poor at eliminating aldehydes and formaldehyde in particular, while this gas is both very present in the ambient air, and a health hazard. Thus, by combining into one filtration device, firstly, a traditional absorbent or adsorbent material, and secondly, a specific adsorbent material that is particularly effective for aldehydes and notably formaldehyde, the filtration device (110) according to the invention can simultaneously eliminate aldehydes, and in particular formaldehyde, due to the presence of the nanoporous specific adsorbent material functionalized with probe molecules, and the other volatile organic compounds, in particular the family of monocyclic aromatic hydrocarbons (benzene, toluene, ethylene, xylene, and others) due to the activated carbon or zeolites.

The combination of traditional absorbent and specific adsorbent materials is formed by combining them into a series of single-material filtering cartridges (104, 106). The traditional cartridges can be a pollen filter, an activated carbon filter, a HEPA filter, and combined with one or more cartridges according to the invention, which can be inserted between the traditional cartridges or placed last, after the traditional cartridges. These combinations make it possible to eliminate aldehydes, as well as purify the ambient air, and due to the arrangement of the filtering cartridges mentioned previously, limit any re-release caused by the zeolite or activated carbon. In one embodiment of the invention, the filtration device comprises four separate filtering cartridges (103, 104, 105, 106), as depicted in FIG. 1. In one embodiment, filtering cartridge 103 is a perforated film for stopping dust and/or debris, filtering cartridge 104 contains the traditional absorbent materials, filtering cartridge 105 is a HEPA filter, an air filter capable of filtering, in one pass, at least 99.95% of particles with a diameter of greater than or equal to 0.3 µm, and finally filtering cartridge 106 contains the specific adsorbent medium.

According to the invention, the decontamination/filtration performance of the cartridge is determined in particular by the following parameters:
The ratio by mass between the traditional absorbent or adsorbent material and the specific adsorbent material,
The specific surface of the specific adsorbent material,
The form of the specific adsorbent material,
The physical and chemical properties of the traditional absorbent or adsorbent material.

The ratio by mass between the specific adsorbent material and the traditional absorbent or adsorbent material can vary by a factor of 5/95 to 95/5, and preferably by a factor of 6/94 to 50/50, and even more preferably by a factor of 8/92 to 15/85; the particular selection is made based on the nature and quantity of contaminants present in the ambient air and the desired performance to be attained.

As an example, for air containing 20 µg/m³ of formaldehyde and 200 µg/m³ of other volatile organic compounds, a ratio by mass of specific adsorbent material to activated carbon of 10/90 will preferably be used. However, it is possible to drastically improve the efficacy of the filtering medium according to the invention by doubling, quadrupling, and so on, the quantity of the specific adsorbent material.

Thus, in the case of ambient air heavily polluted with formaldehyde, containing, for example, 10 times more formaldehyde than other volatile organic compounds, a filtration device (110) can be used with a ratio of specific adsorbent material to activated carbon of 90/10.

The specific surface sought for the specific adsorbent material is inversely proportional to the size of the pores. Thus, the larger the specific surface, the smaller the size of the pores. Thus, in order to have a specific surface on the order of 800 m²/g, the diameter of the pores is typically between 0.20 and 10 nm.

The best compromise between a maximum specific surface making it possible to increase the trapping efficacy and capacity, and a limit not to be exceeded in order to have pores that are large enough for the contaminants to enter the pores, is sought. The target specific surface range falls between 100 and 1500 m²/g, depending on the size of the contaminant molecule to be eliminated, and preferably between 600 and 800 m²/g for formaldehyde.

The choice of granule shape for the specific adsorbent material is determined so as to have the maximum adsorption surface area (external surface of the granule) to increase the trapping efficacy, while having the lowest load loss to minimize the energy necessary to remove contaminants. In one embodiment, the granule is cylindrical. In one embodiment, the granule is spherical. In one embodiment, the granule is elongated in shape. In one embodiment, the granule is any shape.

Elongated cylindrical shapes, or in other words with an L/D ratio of >1 (L=length, D=diameter), are very advantageous, as they are easy to manufacture by molding or extrusion. Their elongated shapes prevent the flat surfaces from sticking together, so as not to decrease the adsorption surface area and so as not to increase load and energy losses. In this case, the dimensions (length) on the order of the millimeter, and preferably 0.1 to 8 mm, also result in a better compromise. In one embodiment, the specific adsorbent material is in the form of cylindrical granules with a length L=5.5 mm and a diameter D=3 mm.

In another embodiment, the granule may be in ground form, resulting in particles on the order of the millimeter, and preferably from 0.12 to 8 mm. This form also offers an advantage, as it provides, for roughly the same particle diameter, a greater adsorption surface area than that of spherical particles of the same diameter.

Granules sized smaller than the millimeter can also be used, provided that inter-granule (fiber) supports are used, making it possible to disperse the granule to decrease load loss. In this case, films of granules of specific adsorbent material encased in fabric could be considered, which would increase the surface of the filter in order to decrease load loss.

Moreover, other criteria, such as the dimensions of the rigid alveolar structure and the fill percentage of the alveoli can also be adjusted to obtain the desired performance of the filtering cartridge according to the invention. Thus, the size of the alveoli of the structure is between 1 and 15, and preferably between 1 and 10 times the maximum size of a granule of specific adsorbent material. This dimension makes it possible to obtain a good distribution of granules in the alveoli and to be able to receive at least 1 granule per alveolus of the rigid alveolar structure.

Likewise, the fill percentage of filtering medium in the alveoli is, for example, at least 40%. This makes it possible to limit the saturation of a second structure of the filtering cartridge (106) according to the invention.

The filtering device (110) according to the invention does not call into question the general architecture of existing ambient air purification appliances. Indeed, it suffices to simply insert the different filtering cartridge structures in the positions provided in the housing (108) of the purification appliance. The composition and characteristics of the filtering cartridge according to the invention will then be adjusted based on the features of the ambient air purification appliance, and in particular, based on the air output and dimensions of the cartridge.

The filtration device may be characterized by a ratio of material defined by the ratio between the mass of specific adsorbent material (g) and the air output ($m^3$/hour) of the appliance. In one embodiment, the ratio of material will be between 1/10 and 1, and more preferably 1/7.

Example dimensions of the filtration device (110) according to the invention:

The first example is defined to decontaminate a room with the following characteristics:
Volume: 12 $m^3$,
Replacement with fresh air: 5 $m^3$/hour,
Formaldehyde emission level: 70.6 $\mu g/m^3$.
The characteristics of the purification appliance using the filtering cartridge according to the invention are as follows:
Air output: 140 $m^3$/hour,
Mass of specific adsorbent material: 20 g.
Ratio of material/air output: 1/7.
FIG. 4 presents the change in formaldehyde concentration in the room.
Graph A shows the control value at 70.6 $\mu g/m^3$ without an ambient air purification appliance according to the invention.
Graph B shows the change in the concentration when the ambient air purification appliance according to the invention is operating.

Thus, it is shown that within a few hours of operation, the formaldehyde emission level drops below 20 $\mu g/m^3$ (less than the level of 30 $\mu g/m^3$ recommended for buildings open to the general public).

The second example is defined to decontaminate a room with the same characteristics as in the prior example, but with the features of the ambient air purification appliance using the filtering cartridge according to the invention, which are as follows:
Air output: 70 $m^3$/hour,
Mass of specific adsorbent material: 10 g.
Ratio of material/air output: 1/7.
FIG. 5 shows the change in the formaldehyde concentration in the room.
Graph A' shows the control value at 70.6 $\mu g/m^3$ without an ambient air purification appliance according to the invention.
Graph B' shows the change in concentration when the ambient air appliance according to the invention is operating.

Thus, we see that within a few hours of operation, the formaldehyde emission level is on the order of 30 $\mu g/m^3$.

It is understood that various modifications and/or improvements obvious to a person of ordinary skill in the art could be made to the embodiments of the invention described in this description, while still remaining within the scope of the invention defined by the attached claims.

Thus, the examples of embodiments have been provided for an ambient air purification appliance for household use (rooms of a few $m^3$ in size). Applications of filtering cartridges according to the invention in an ambient air purification appliance with larger dimensions (for example, adapted for a building open to the general public) could be considered. It would suffice to simply use multiple cartridges or cartridges that are larger in size.

The invention claimed is:

1. A filtration device for an air purification appliance comprising a first filtering cartridge structure containing a traditional absorbent or adsorbent material, the traditional absorbent or adsorbent material being selected from among activated carbon or zeolite, wherein the filtration device comprises a second separate filtering cartridge structure holding in place a filtering medium comprising a nanoporous matrix of metal oxides, said matrix containing a specific adsorbent material that is porous and functionalized with at least one probe molecule configured to trap chemical contaminants of an aldehyde type, wherein a specific surface area of the specific adsorbent material is between 400 and 1200 $m^2/g$, wherein the at least one probe molecule is added to the specific adsorbent material in situ to functionalize the specific adsorbent material, and wherein the specific adsorbent material is in the form of granules.

2. The filtration device for an air purification appliance according to claim 1, wherein the specific adsorbent material is manufactured by a sol-gel process.

3. The filtration device for an air purification appliance according to claim 1, wherein the probe molecule possesses a reactive function capable of reacting with an aldehyde function is selected from among enaminones and a corresponding β-diketone/amine pairs, imines, amines, imides and hydrazines, or salts derived from these compounds.

4. The filtration device for an air purification appliance according to claim 1, wherein the structure holding the filtering medium is a rigid alveolar structure, the alveoli containing the filtering medium.

5. The filtration device for an air purification appliance according to claim 4, wherein a micro-perforated film is assembled on the upstream and downstream surfaces of the rigid alveolar structure.

6. The filtration device for an air purification appliance according to claim 4, wherein a fill percentage of filtering medium in the alveoli is greater than 40%.

7. The filtration device for an air purification appliance according to claim 1, wherein the form of the granules is cylindrical with a L/D ratio of >1, in which L is the length of a granule and D is the diameter of a granule.

8. The filtration device for an air purification appliance according to claim 1, wherein the structure holding the filtering medium is an assembly of several films of a non-woven porous fabric type, onto which the traditional absorbent or adsorbent material is impregnated/sprinkled.

9. The filtration device for an air purification appliance according to claim 1, wherein the mass of specific adsorbent material accounts for between 5 and 95% of the mass of the traditional absorbent or adsorbent material.

10. The filtration device for an air purification appliance according to claim 1, wherein the specific surface area of the specific adsorbent material is between 450 and 800 $m^2/g$.

11. An air purification appliance comprising at least one filtration device defined according to claim 1.

12. The air purification appliance according to claim 11, wherein the specific absorbent material is manufactured by a sol-gel process for synthesis.

* * * * *